(12) United States Patent
Luft et al.

(10) Patent No.: US 9,032,937 B2
(45) Date of Patent: May 19, 2015

(54) FUEL AIR MIXER FOR COMBUSTION ENGINES

(71) Applicant: Caterpillar Inc., Peoria, IL (US)

(72) Inventors: Aaron C. Luft, Frankfort, IN (US); Jordan P. Gilsinger, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/751,867

(22) Filed: Jan. 28, 2013

(65) Prior Publication Data

US 2014/0209075 A1 Jul. 31, 2014

(51) Int. Cl.
*F02B 43/00* (2006.01)
*F02M 29/00* (2006.01)
*F02M 21/04* (2006.01)

(52) U.S. Cl.
CPC ............ *F02M 29/00* (2013.01); *F02M 21/042* (2013.01)

(58) Field of Classification Search
CPC .. F23R 3/286; F23R 3/28; F23R 2900/00012; F23R 3/14; F23R 3/36; F23R 3/50
USPC ............... 123/527, 590; 48/180.1; 239/434.5; 261/51
See application file for complete search history.

(56) References Cited

U.S. PATENT DOCUMENTS

| 4,425,898 | A | * | 1/1984 | McLean | 123/527 |
|---|---|---|---|---|---|
| 5,408,978 | A | * | 4/1995 | Davis | 123/527 |
| 5,527,367 | A | * | 6/1996 | Harada | 48/189.3 |
| 5,662,077 | A | * | 9/1997 | Boswell | 123/184.21 |
| 5,908,475 | A | * | 6/1999 | Morris et al. | 48/189.3 |
| 6,626,158 | B2 | * | 9/2003 | Algeri | 123/527 |
| 7,426,920 | B1 | * | 9/2008 | Petersen | 123/527 |
| 7,882,699 | B2 | | 2/2011 | Cheng | |
| 7,942,139 | B1 | * | 5/2011 | Rockwell | 123/590 |
| 8,047,185 | B2 | | 11/2011 | Ulrey et al. | |
| 2002/0185117 | A1 | * | 12/2002 | Algeri | 123/590 |
| 2006/0245296 | A1 | * | 11/2006 | Nishioka et al. | 366/174.1 |
| 2009/0217669 | A1 | * | 9/2009 | Young | 60/737 |

* cited by examiner

*Primary Examiner* — Marguerite McMahon
*Assistant Examiner* — Tea Holbrook
(74) *Attorney, Agent, or Firm* — Miller, Matthias & Hull LLP

(57) ABSTRACT

A fuel air mixer includes a fuel air mixing tube having an inlet, an outlet, and an inlet inner diameter. A collar is attached at the mixing tube inlet and includes a first cylindrical portion upstream of the mixing tube inlet, and a body portion encircling the mixing tube at the mixing tube inlet and forming a fuel reservoir around the mixing tube inlet. The first cylindrical portion is spaced from the mixing tube inlet to create a gap placing the fuel reservoir in fluid communication with the mixing tube inlet. The first cylindrical portion has an inner diameter that is smaller than the inlet inner diameter so air flowing through the first cylindrical portion and into the mixing tube inlet draws gaseous fuel from the fuel reservoir into the mixing tube through the gap.

20 Claims, 6 Drawing Sheets

FUEL AIR MIXER FOR COMBUSTION ENGINES

TECHNICAL FIELD

This disclosure relates generally to combustion engines and, in particular, to a fuel air mixer for creating a homogeneous mixture of filtered air and gaseous fuel upstream from a turbo compressor of a combustion engine.

BACKGROUND

In some combustion engines, such as engines combusting gasoline, diesel, natural gas, propane, methane, other gaseous hydrocarbons and the like, a fuel air mixture is produced upstream from a turbo compressor and fed into the turbo compressor to increase the fluid pressure prior to injection into a combustion chamber. The fuel is mixed with air, typically after the air passes through an air filter, in a fuel air mixing tube a short distance away from an inlet of the turbo compressor. If the fuel and air are not fully mixed prior to entering the turbo compressor, the fuel air mixture can have variable densities and temperatures when the mixture comes into contact with the blades of the turbo compressor that are moving at a high rate of speed.

FIG. 1 illustrates an example of a fuel air mixing tube 10 that is presently used in combustion engines. The exemplary fuel air mixing tube 10 includes a mixing elbow 12 having an inlet 14 that receives air from an air filter (not shown) of the combustion engine and an outlet 16 that outputs the fuel air mixture to a turbo compressor (not shown) of the engine. An end of a fuel tube 18 is inserted through an opening 20 through the external surface of the mixing elbow 12 and into the interior of the mixing elbow 12 to position the fuel tube 18 in the flow path of the air from the air filter. The fuel tube 18 includes one or more orifices 22 positioned at the end of the fuel tube 18 disposed within the interior of the mixing elbow 12. Gaseous fuel from a fuel source (not shown) of the gaseous fuel combustion engine is pumped from a regulator (not shown) through the field tube 18 and exits the field tube 18 through the orifices 22 and into the interior of the mixing elbow 12. The fuel exiting the orifices 22 mixes with the air from the air filter to produce the fuel air mixture that is discharged from the outlet 16 to the turbo compressor.

In the arrangement of the fuel air mixing tube 10 shown in FIG. 1, the gaseous fuel and the air are not well mixed when the fuel air mixture is discharged from the outlet 16 of the mixing elbow 12 and arrives at the turbo compressor. The poor mixing results in variable densities and temperatures in the fuel air mixture instead of a consistent mixture passing through the turbo compressor. FIG. 2 illustrates the mixture of fuel and air that is produced at the outlet 16 of the mixing elbow 12. After the injection of fuel through the orifices 22, a central strip 24 having a high concentration cloud of fuel is formed at the center of the outlet 16, and lateral areas 26 having relatively low concentrations of fuel and high concentrations of air are formed on either side of the central strip 24. When this non-uniformly distributed mixture comes into contact with the turbine blades, impact of the higher density mixture of the central strip 24 on the turbine blades can fatigue the turbine blades over time at a relatively rapid rate. The turbo compressor wheels spin at a high rate of speed, and the high density portion of the fuel air mixture can cause fatigue cycles in minutes to hours that lead to premature failures of the turbine blades. In view of the risk of premature failure of the turbine blades caused by the fuel air mixture produced by the existing fuel air mixing tube 10, a need exists for an improved fuel air mixer providing a more optimal fuel air mixture with more uniform densities and temperatures that does not unduly increase the rate of accumulation of fatigue on the turbine blades.

SUMMARY OF THE DISCLOSURE

In one aspect of the present disclosure, a fuel air mixer for a gas engine is disclosed. The fuel air mixer includes a mixing tube having a mixing tube inlet with an annular rim and mixing tube inlet inner diameter, and a mixing tube outlet in fluid communication with the mixing tube inlet, a first cylindrical portion disposed upstream of the mixing tube inlet and having a first edge, an oppositely disposed second edge disposed proximate the mixing tube inlet with the second edge of the first cylindrical portion and the annular rim of the mixing tube inlet being spaced apart by an opening, and a first cylindrical portion inner diameter that is greater than the mixing tube inlet inner diameter, and a body portion encircling the mixing tube inlet and engaging the mixing tube and the first cylindrical portion so that an inner surface of the body portion and an exterior surface of the mixing tube encircled by the body portion define a fuel reservoir with the opening between the second edge of the first cylindrical portion and the annular rim of the mixing tube inlet placing the fuel reservoir in fluid communication with the mixing tube inlet. The body portion further includes a fuel inlet port placing the fuel reservoir in fluid communication with an exterior of the body portion.

In another aspect of the present disclosure, a fuel air mixer is disclosed. The fuel air mixer includes a mixing tube and a collar coupled to the mixing tube. The mixing tube includes a mixing tube inlet with an annular rim, a mixing tube inlet inner diameter, and a mixing tube inlet outer diameter, and a mixing tube outlet in fluid communication with the mixing tube inlet, with the collar being coupled at the mixing tube inlet. The collar includes a first cylindrical portion having a first edge, an oppositely disposed second edge and a first cylindrical portion inner diameter that is greater than the mixing tube inlet inner diameter, a second cylindrical portion having a first edge, an oppositely disposed second, and a second cylindrical portion inner diameter that is greater than the mixing tube inlet outer diameter, and an intermediate cylindrical portion disposed between the first cylindrical portion and the second cylindrical portion, the intermediate cylindrical portion having a first edge connected to the second edge of the first cylindrical portion, an oppositely disposed second edge connected to the first edge of the second cylindrical portion, and an intermediate cylindrical portion inner diameter that is greater than the mixing tube inlet outer diameter. The collar further includes a fuel inlet opening extending through an external surface of the collar and placing an interior of the collar in fluid communication with an exterior of the collar. The collar is disposed on the mixing tube at the mixing tube inlet with the intermediate cylindrical portion encircling a corresponding portion of the mixing tube proximate the mixing tube inlet with the intermediate cylindrical portion and the corresponding portion of the mixing tube defining a fuel reservoir. A gap is defined between the annular rim of the mixing tube inlet and the second edge of the first cylindrical portion of the collar, with the gap placing the fuel reservoir in fluid communication with the mixing tube inlet.

In a further aspect of the present disclosure, a collar is disclosed for a mixing tube having a mixing tube inlet with an annular rim, a mixing tube inlet inner diameter, and a mixing tube inlet outer diameter, and a mixing tube outlet in fluid communication with the mixing tube inlet. The collar includes a first cylindrical portion having a first edge, an oppositely disposed second edge and a first cylindrical portion inner diameter that is greater than the mixing tube inlet inner diameter, a second cylindrical portion having a first edge, an oppositely disposed second, and a second cylindrical portion inner diameter that is greater than the mixing tube inlet outer diameter, and an intermediate cylindrical portion disposed between the first cylindrical portion and the second cylindrical portion, the intermediate cylindrical portion having a first edge connected to the second edge of the first cylindrical portion, an oppositely disposed second edge connected to the first edge of the second cylindrical portion, and an intermediate cylindrical portion inner diameter that is greater than the mixing tube inlet outer diameter. The collar further includes a fuel inlet opening extending through an external surface of the collar and placing an interior of the collar in fluid communication with an exterior of the collar. The intermediate cylindrical portion encircles a corresponding portion of the mixing tube proximate the mixing tube inlet when the collar is disposed on the mixing tube, and the intermediate cylindrical portion and the corresponding portion of the mixing tube define a fuel reservoir. A gap is defined between the annular rim of the mixing tube inlet and the second edge of the first cylindrical portion of the collar, with the gap placing the fuel reservoir in fluid communication with the mixing tube inlet.

Additional aspects are defined by the claims of this patent.

DETAILED DESCRIPTION

Although the following text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 3:
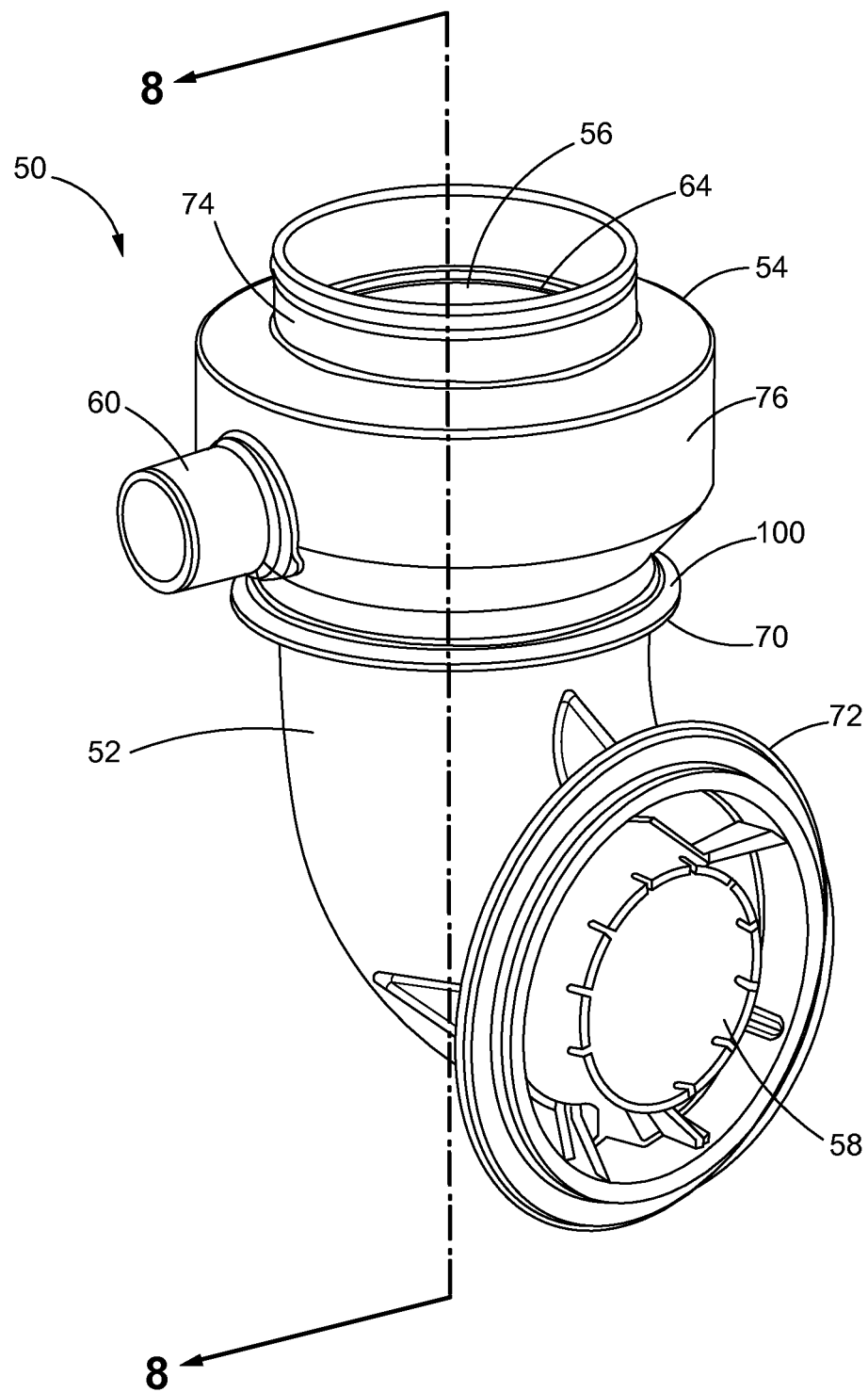
FIG. 3 is a perspective view of a fuel air mixer in accordance with the present disclosure.

FIG. 3 illustrates an embodiment of a fuel air mixer 50 for a combustion engine (not shown) in accordance with the present disclosure providing a more homogeneous mixture of gaseous fuel and air to a turbo compressor (not shown) of the engine. The fuel air mixer 50 includes a fuel air mixing tube 52 and an accompanying collar 54. The fuel air mixing tube 52 includes a mixing tube inlet 56 and a mixing tube outlet 58, and may be similar to the mixing elbow 12, but does not have a fuel tube penetrating an exterior surface of the fuel air mixing tube 52. Instead, the gaseous fuel is provided to the fuel air mixing tube 52 via a fuel inlet port 60 of the collar 54 in a manner discussed further below.

Figure 5:
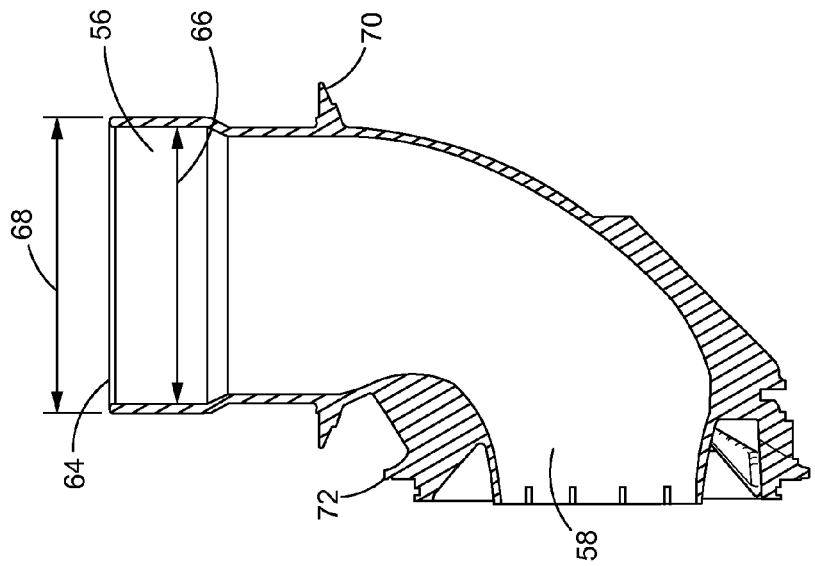
FIG. 5 is a cross-sectional view of the fuel air mixing tube of FIG. 4 taken through line 5-5.
Figure 4:
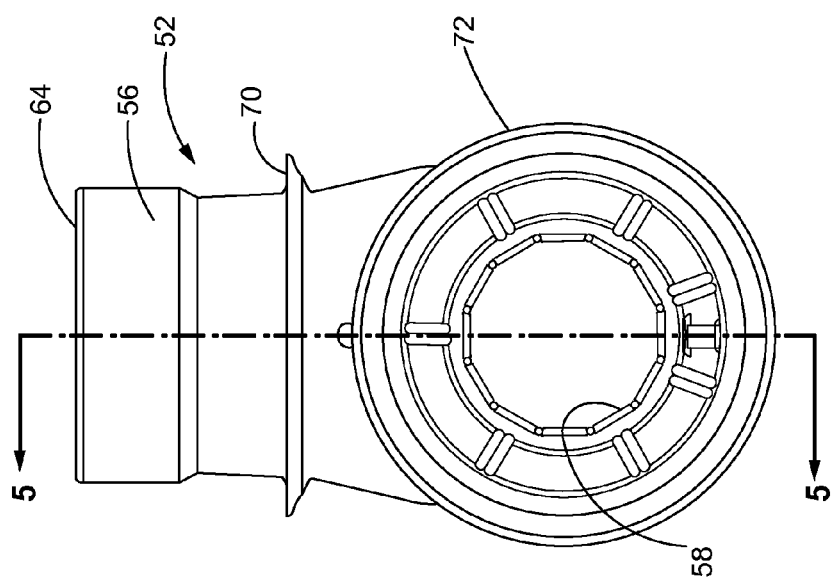
FIG. 4 is a front view of a fuel air mixing tube of the fuel air mixer of FIG. 3.

Referring to FIGS. 4 and 5, the fuel air mixing tube 52 is shown in greater detail. In the present embodiment, the fuel air mixing tube 52 has a bend orienting the mixing tube outlet 58 at approximately a 90° angle with respect to the mixing tube inlet 56. However, those skilled in the art will understand that the fuel air mixer 50 may also be implemented with a straight tube, or with a tube having a bend orienting the mixing tube outlet 58 at a specified angle with respect to the mixing tube inlet 56 that is other than a 90° as necessary based on the engine in which the fuel air mixer 50 is installed. The interior of the mixing tube 52 places the mixing tube inlet 56 in fluid communication with the mixing tube outlet 58 so that air from an upstream air filter (not shown) entering the mixing tube 52 at the mixing tube inlet 56 flows through the mixing tube 52 and out the mixing tube outlet 58.

The mixing tube inlet 56 may be generally cylindrically shaped as shown, and have an annular rim 64 at the opening of the inlet 56, and a mixing tube inlet inner diameter 66 and a mixing tube inlet outer diameter 68 proximate the annular rim 64. The mixing tube 52 may include an annular first mixing tube flange 70 extending outwardly from an external surface of the mixing tube 52 at a location proximate the mixing tube inlet 56 and downstream from the annular rim 64 for engagement and retention of the collar 54 as will be discussed further below. The mixing tube 52 may further include an annular second mixing tube flange 72 extending outwardly from the external surface of the mixing tube 52 proximate the mixing tube outlet 58 for connection of a conduit (not shown) placing the mixing tube outlet 58 in fluid communication with an inlet of the turbo compressor.

Figure 6:
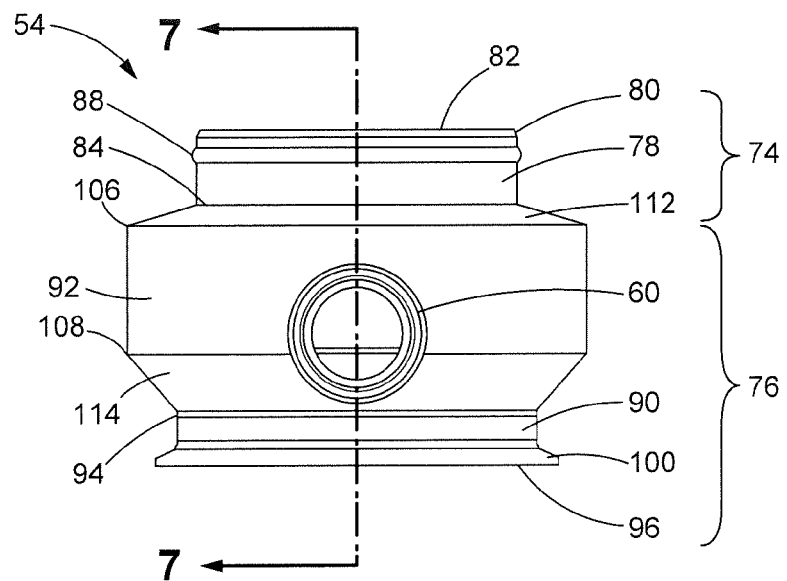
FIG. 6 is a side view of a collar of the fuel air mixer of FIG. 3.
Figure 7:
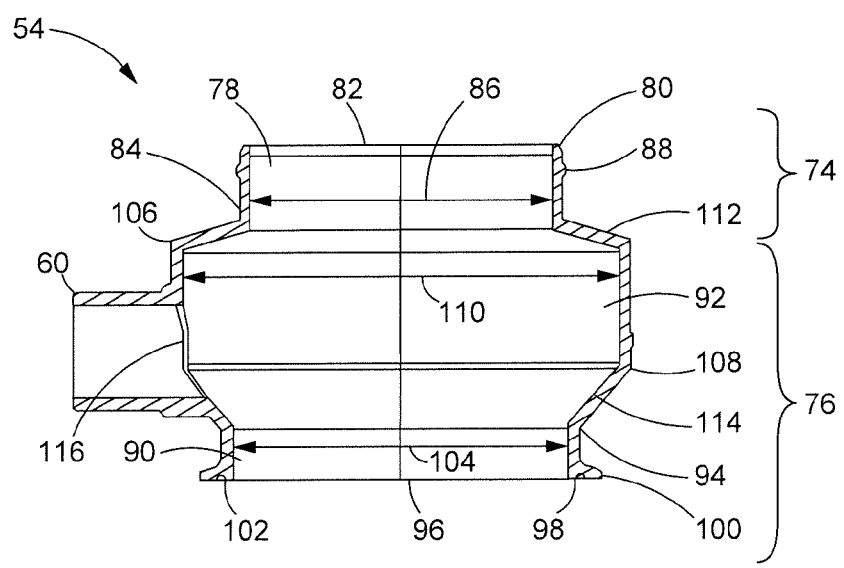
FIG. 7 is a cross-sectional view of the collar of FIG. 6 taken through line 7-7.

The collar 54 is configured to cooperate with the configuration of the fuel air mixing tube 52 to create a homogeneous fuel air mixture that is transmitted to the turbo compressor. Referring to FIGS. 6 and 7, the collar 54 includes an inlet portion 74 and a body portion 76. As discussed further below, when the collar 54 is mounted onto the fuel air mixing tube 52, the body portion 76 encircles the mixing tube 52 at the mixing tube inlet 56, and the inlet portion 74 is disposed upstream of the annular rim 64 of the mixing tube inlet 56. In the illustrated embodiment, the inlet portion 74 of the collar 54 includes a first cylindrical portion 78 of the collar 54 having a first edge 80 with an upper annular rim 82, and a second edge 84 disposed opposite the first edge 80 and proximate the body portion 76. An inner surface of the first cylindrical portion 78 has collar inlet portion inner diameter 86 that is less than the mixing tube inlet inner diameter 66 to control the flow of air through the fuel air mixer 50 as will be described more fully below. The first cylindrical portion 78 may further include a mechanism for connection of a conduit (not shown) placing the inlet portion 74 of the collar 54 in fluid communication with an upstream air filter (not shown) providing air for the fuel air mixture. As shown, the connection mechanism may include an annular raised detent 88 extending outwardly from an outer surface of the first cylinder portion 78 to engage an inner surface or other corresponding connection mechanism of the conduit from the air filter.

The body portion 76 of the collar 54 includes a second cylindrical portion 90 and an intermediate cylindrical portion 92 disposed between the first cylindrical portion 78 and the second cylindrical portion 90. The second cylindrical portion 90 includes a first edge 94 proximate the intermediate cylindrical portion 92 and a second edge 96 disposed opposite the first edge 94. The second edge 96 has an annular rim 98, and a second cylindrical portion flange 100 extends outwardly from the second cylindrical portion 90 at the annular rim 98. The annular rim 98 and the second cylindrical portion flange 100 are configured to engage the first mixing tube flange 70 when the collar 54 is installed on the fuel air mixing tube 52. The second annular rim 98 may include an inwardly extending annular recess 102 configured to receive a sealing device such as an O-ring seal (not shown) that engages the first mixing tube flange 70 to form a substantially airtight seal between the flanges 70, 100 when the collar 54 is installed. An inner surface of the second cylindrical portion 90 has second cylindrical portion inner diameter 104 that is greater than the mixing tube inlet inner diameter 66 to allow the body portion 76 of the collar 54 to be slipped over the mixing tube inlet 56 during assembly.

As mentioned above, the intermediate cylindrical portion 92 is disposed between the first cylindrical portion 78 and the second cylindrical portion 90. The intermediate cylindrical portion 92 has a first edge 106 proximate the first cylindrical portion 78 and a second edge 108 proximate the second cylindrical portion 90. An inner surface of the intermediate cylindrical portion 92 has an intermediate cylindrical portion inner diameter 110 that is greater than the mixing tube inlet outer diameter 68 so that the mixing tube inlet 56 is disposed within the intermediate cylindrical portion 92 when the collar 54 is installed on the mixing tube 52. The first edge 106 of the intermediate cylindrical portion 92 is connected to the second edge 84 of the first cylindrical portion 78 by a first transition portion 112, and the second edge 108 of the intermediate cylindrical portion 92 is connected to the first edge 94 of the second cylindrical portion 90 by a second transition portion 114. In the illustrated embodiment, the transition portions 112, 114 each have generally conical shapes that transition from the smaller first cylindrical portion inner diameter 86 and the second cylindrical portion inner diameter 104, respectively, to the larger intermediate cylindrical portion inner diameter 110. However, the transition portions 112, 114 may have any appropriate shape necessary to connect the cylindrical portions 78, 90, 92 and assist in forming the fuel air mixture as discussed further below. Moreover, the portions 78, 90, 92 do not necessarily require cylindrical shapes as long as the collar 54 cooperates with the fuel air mixing tube 52 to form a homogeneous mixture of fuel and air.

As discussed above, fuel is provided to the collar 54 through the fuel inlet port 60. The fuel inlet port 60 extends outwardly from an exterior surface of the collar 54 within the body portion 76. In the illustrated embodiment, the fuel inlet port 60 is disposed at a fuel inlet opening 116 through the body portion 76 at the intermediate cylindrical portion 92 and the second transition portion 114. However, the fuel inlet opening 116 may be placed at any appropriate location of the body portion 76 placing the fuel inlet port 60 in fluid communication with the interior of the body portion 76 of the collar 54. While the fuel inlet port 60 is illustrated as being generally cylindrical, the fuel inlet port 60 may have any appropriate configuration necessary for attachment of a conduit (not shown) placing the collar 54 in fluid communication with a fuel source capable of transmitting fuel to the fuel air mixer 50.

INDUSTRIAL APPLICABILITY

Figure 8:
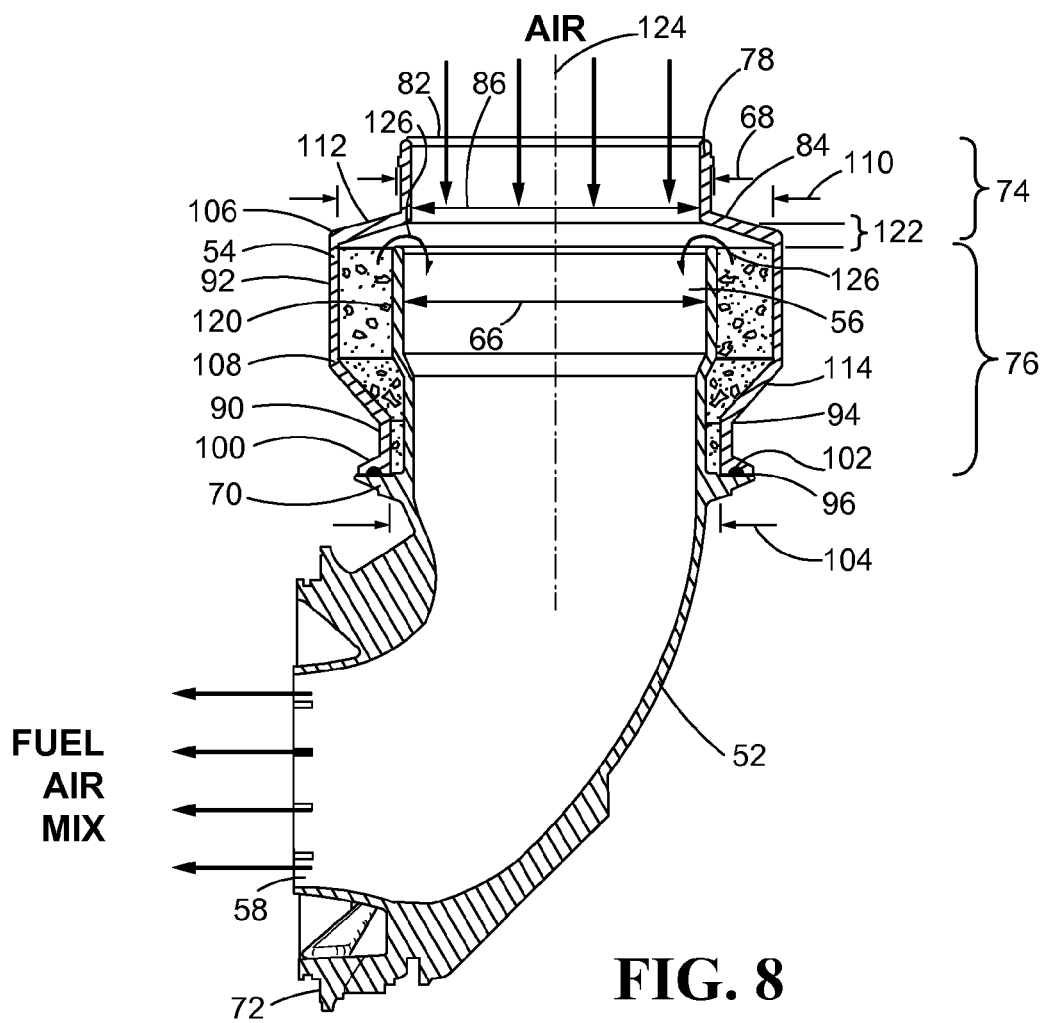
FIG. 8 is a cross-sectional view of the fuel air mixer of FIG. 3 taken through line 8-8.

FIG. 8 provides a cross-sectional view of the fuel air mixer 50 with the collar 54 installed on the fuel air mixing tube 52. Because the second cylindrical portion inner diameter 104 and the intermediate cylindrical portion inner diameter 110 are greater than the mixing tube inlet outer diameter 68, the body portion 76 of the collar 54 is installed over of the mixing tube inlet 56 with the flanges 70, 100 facing and engaging and an annular seal (not shown) disposed in the annular recess 102 forming a substantially airtight seal there between. Once the collar 54 is installed on the mixing tube inlet 56, the flanges 70, 100 may be secured to each other by a V-band clamp, bolts, or other appropriate fastening mechanism for securing the flanges 70, 100 and aligning the collar 54 with respect to the mixing tube inlet 56.

The inner surfaces of the second cylindrical portion 90 and the intermediate cylindrical portion 92, and the outer surface of the mixing tube 52 between the mixing tube inlet annular rim 64 and the mixing tube inlet flange 70 define a fuel reservoir 120 for receiving gaseous fuel from the fuel source via the fuel inlet port 60. The first transition portion 112 disposes the first cylindrical portion 78 upstream from the mixing tube inlet annular rim 64, thereby creating an annular gap 122 between the mixing tube inlet annular rim 64 and the second edge 84 of the first cylindrical portion 78. The annular gap 122 places the fuel reservoir 120 in fluid communication with the interior of the mixing tube inlet 56 such that gaseous fuel in the fuel reservoir 120 may flow through the gap 122 and into the mixing tube inlet 56 as will be discussed more fully below.

After the collar 54 is installed on the mixing tube inlet 56 and the flanges 70, 100 are secured together, the mixing tube inlet 56 and the first cylindrical portion 78 of the collar 54 are substantially aligned along a longitudinal axis 124. The first cylindrical portion inner diameter 86 is smaller than the mixing tube inlet inner diameter 66. As a result, air entering the fuel air mixer 50 from the air filter passes through the first cylindrical portion 78 of the collar 54 and into the mixing tube inlet 56 without flowing through the gap 122 and into the fuel reservoir 120. The flow path for the air widens as the air flows past the gap 122 and into the mixing tube inlet 56, and the arrangement causes a pressure drop at the gap 122 due to the Venturi effect. The reduced pressure in the mixing tube inlet 56 draws gaseous fuel from the fuel reservoir 120 into the mixing tube inlet 56 is indicated by arrows 126. The fuel from the fuel reservoir 120 mixes with the air from the air filter flowing through the fuel air mixing tube 52 and flows through the mixing tube 52 toward the mixing tube outlet 58.

Figure 1:
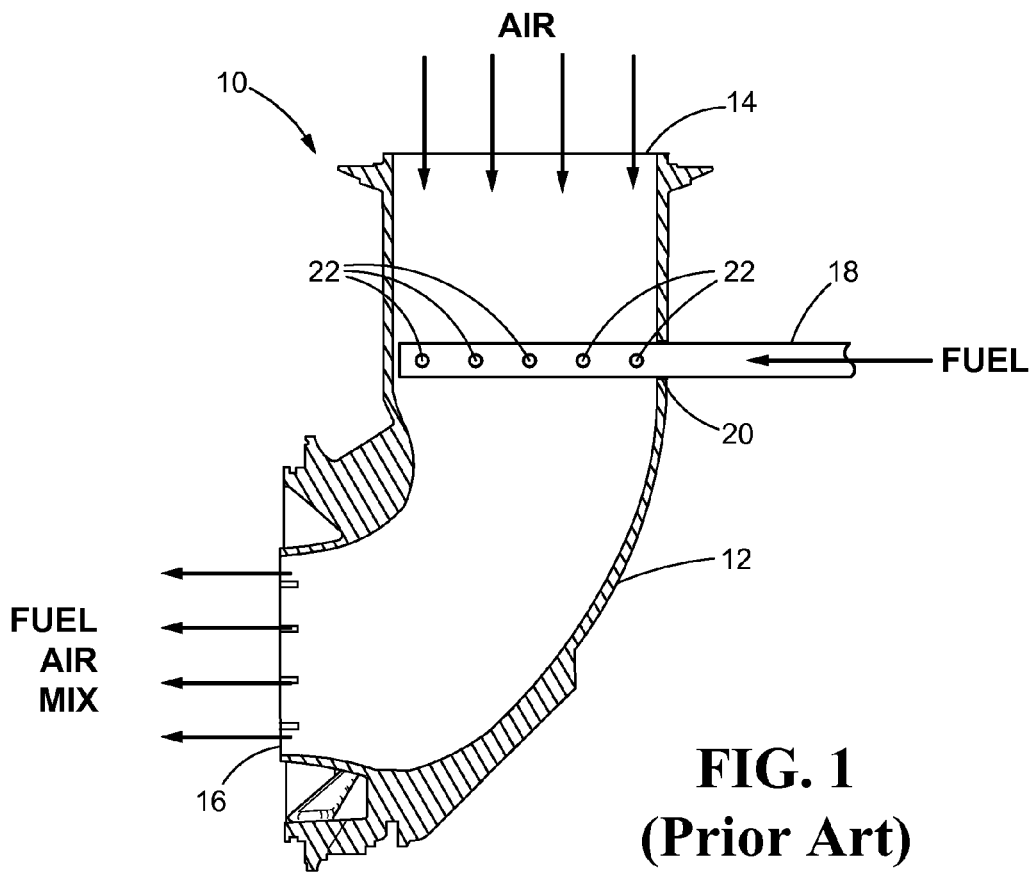
FIG. 1 is a side cross-sectional view of an example of a prior art fuel air mixing tube.
Figure 2:
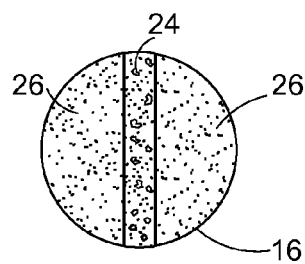
FIG. 2 is an illustration of a fuel and air distribution produced at an outlet of the fuel air mixing tube of FIG. 1.
Figure 9:
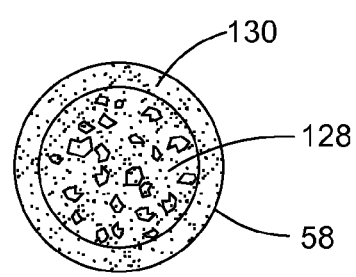
FIG. 9 is an illustration of a fuel and air distribution produced at an outlet of the fuel air mixer of FIG. 3.

As the air and fuel flow to the mixing tube outlet 58, a more homogeneous fuel air mixture is produced then in previously known fuel air mixing tube such as the tube 10 illustrated in FIG. 1. As shown in FIG. 9, the mixture of fuel and air produced at the mixing tube outlet 58 has a centrally located cloud 128 of mixed fuel and air and a relatively thin annular boundary layer 130 of air proximate the inner surface of the mixing tube 52. The fuel and air are uniformly distributed in the cloud 128 resulting in uniform density and temperature in the mixture. The more homogeneous mixture in the cloud 128 results in a consistent impact force with the turbine blades that more closely approximates the loads anticipated on the turbine blades during the design of the turbo compressor and the combustion engine. Consequently, the turbine blades will accumulate fatigue at a slower rate and will require replacement less frequently.

To have a proper amount of gaseous fuel flow into the mixing tube inlet 56, the annular gap 122 may be very narrow compared to the inner diameters 66, 86 of the mixing tube inlet 56 and the first cylindrical portion 78 of the collar 54, respectively. In exemplary designs, the mixing tube inlet 56 may have a mixing tube inlet inner diameter 66 equal to 8 inches (20.32 centimeters) or 12 inches (30.48 centimeters), and the first cylindrical portion 78 may have corresponding inner diameters 86 equal to 8.5 inches (21.59 centimeters) or 12.5 inches (31.75 centimeters), respectively. In these examples, the annular gap 122 may have a distance of approximately 6 mm (approximately 0.2362 inch) between the annular rim 64 of the mixing tube inlet 56 and the second edge 84 of the first cylindrical portion 78. Gaseous fuel may be provided from the fuel source to the fuel reservoir 120 by a pressure regulator (not shown) at approximately 3-5 psi. At those pressures, fuel accumulates in the fuel reservoir 120 without substantial amounts of the fuel passing through the gap 122 and into the mixing tube inlet 56 when air from the air filter is not communicated through the fuel air mixing tube 52. Once air begins flowing through the mixing tube 52, the pressure drop is generated at the gap 122 and the gaseous fuel flows into the mixing tube inlet 56 and mixes with the flowing air as described above.

Figure 10:
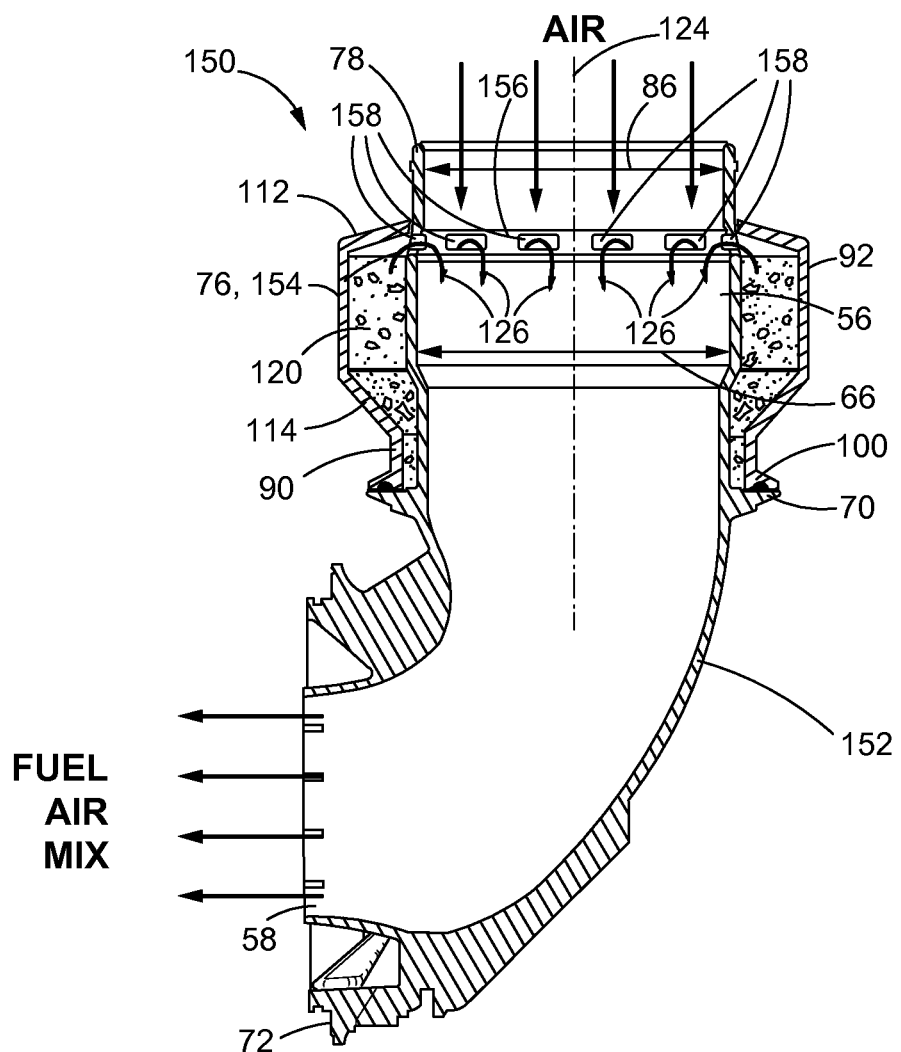
FIG. 10 is a cross-sectional view of an alternative embodiment of a fuel air mixer in accordance with the present disclosure.

Those skilled in the art will understand that alternative configurations of the fuel air mixer 50 as illustrated and described above may be implemented in a combustion engine and are contemplated by the inventor as having use in combustion engines. The alterative configurations may, for example, include a mixing tube surrounded by a fuel reservoir that is placed in fluid communication with the interior of the mixing tube by a flow channel or channels. An alternative embodiment of a fuel air mixer 150 is shown in FIG. 10, for example, with the same reference numerals being used to identify similar elements as those described above. In the fuel air mixer 150, the first cylindrical portion 78 may be formed as part of a mixing tube 152 upstream of the mixing tube inlet 56, and the remaining components of the body portion 76 may form a collar 154 surrounding the mixing tube inlet 56 to form the fuel reservoir 120. The mixing tube 152 may have an appropriate transition portion 156 from the narrower inner surface of the first cylindrical portion 78 to the wider mixing tube inlet 56. The transition portion 156 includes one or more apertures 158 placing the fuel reservoir 120 in fluid communication with the mixing tube inlet 56. The apertures 158 allow the gaseous fuel to be drawn from the fuel reservoir 120 into the mixing tube inlet 56 and mix with the flowing air when the air flows past the transition portion 156. In such an arrangement, the first transition portion 112 of the collar 154 may be configured to sealingly engage the outer surface of the mixing tube 152 at the first cylindrical portion 78 to prevent leakage of the gaseous fuel from the fuel reservoir 120. In a further alternative arrangement, the mixing tube 52 and the collar 54 of the fuel air mixer 50 may be fabricated as a single unitary component, such as by casting or injection molding, so that assembly of the separate components 52, 54 is not required, and only the connections of the conduits from the air filter and fuel source and to the turbo compressor are necessary for installation of the fuel air mixer 50. Additional implementation variations of the fuel air mixers 50, 150 may be apparent to those skilled and in the art and are contemplated by the inventor.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. A fuel air mixer, comprising: a mixing tube comprising a mixing tube inlet with an annular rim and mixing tube inlet inner diameter, and a mixing tube outlet in fluid communication with the mixing tube inlet;
    a first cylindrical portion disposed upstream of the mixing tube inlet and having a first edge, an oppositely disposed second edge disposed proximate the mixing tube inlet with the second edge of the first cylindrical portion and the annular rim of the mixing tube inlet being spaced apart by an opening, and a first cylindrical portion inner diameter that is less than the mixing tube inlet inner diameter;
    a body portion encircling the mixing tube inlet and engaging the mixing tube and the first cylindrical portion so that an inner surface of the body portion and an exterior surface of the mixing tube encircled by the body portion define a fuel reservoir with the opening between the second edge of the first cylindrical portion and the annular rim of the mixing tube inlet placing the fuel reservoir in fluid communication with the mixing tube inlet, wherein a width of the opening between the second edge of the first cylindrical portion and the annular rim is a fixed distance that cannot be varied when the fuel air mixer is assembled, and wherein the body portion further includes a fuel inlet port placing the fuel reservoir in fluid communication with an exterior of the body portion;
    wherein the body portion comprises:
    a second cylindrical portion having a first edge, an oppositely disposed second edge, and a second cylindrical portion inner diameter;
    an intermediate cylindrical portion disposed between the first cylindrical portion and the second cylindrical portion and having a first edge, an oppositely disposed second edge, and an intermediate cylindrical portion inner diameter that is greater than the second cylindrical portion inner diameter;
    a first transition portion connecting the first cylindrical portion to the intermediate cylindrical portion; and
    a second transition portion connecting the second cylindrical portion to the intermediate cylindrical portion.

2. The fuel air mixer of claim 1, wherein the first cylindrical portion and the body portion comprise a collar of the fuel air mixer.

3. The fuel air mixer of claim 1, wherein the opening between the second edge of the first cylindrical portion and the annular rim of the mixing tube inlet comprises an annular gap.

4. The fuel air mixer of claim 1, wherein the mixing tube, the first cylindrical portion and the body portion are formed as a single unitary component.

5. A fuel air mixer, comprising:
a mixing tube comprising a mixing tube inlet with an annular rim and mixing tube inlet inner diameter, and a mixing tube outlet in fluid communication with the mixing tube inlet;
a first cylindrical portion disposed upstream of the mixing tube inlet and having a first edge, an oppositely disposed second edge disposed proximate the mixing tube inlet with the second edge of the first cylindrical portion and the annular rim of the mixing tube inlet being spaced apart by an opening, and a first cylindrical portion inner diameter that is less than the mixing tube inlet inner diameter;
a transition portion connecting the second edge of the first cylindrical portion to the annular rim of the mixing tube inlet; and
a body portion encircling the mixing tube inlet and engaging the mixing tube and the first cylindrical portion so that an inner surface of the body portion and an exterior surface of the mixing tube encircled by the body portion define a fuel reservoir with the opening between the second edge of the first cylindrical portion and the annular rim of the mixing tube inlet placing the fuel reservoir in fluid communication with the mixing tube inlet, and wherein the body portion further includes a fuel inlet port placing the fuel reservoir in fluid communication with an exterior of the body portion.

6. The fuel air mixer of claim 5, comprising a plurality of apertures extending through and circumferentially spaced around the transition portion, with the plurality of apertures placing the fuel reservoir in fluid communication with the mixing tube inlet.

7. A fuel air mixer, comprising:
a mixing tube comprising a mixing tube inlet with an annular rim, a mixing tube inlet inner diameter, and a mixing tube inlet outer diameter, and a mixing tube outlet in fluid communication with the mixing tube inlet; and
a collar coupled to the mixing tube at the mixing tube inlet, the collar comprising:
a first cylindrical portion having a first edge, an oppositely disposed second edge and a first cylindrical portion inner diameter that is less than the mixing tube inlet inner diameter,
a second cylindrical portion having a first edge, an oppositely disposed second, and a second cylindrical portion inner diameter that is greater than the mixing tube inlet outer diameter,
an intermediate cylindrical portion disposed between the first cylindrical portion and the second cylindrical portion, the intermediate cylindrical portion having a first edge connected to the second edge of the first cylindrical portion, an oppositely disposed second edge connected to the first edge of the second cylindrical portion, and an intermediate cylindrical portion inner diameter that is greater than the mixing tube inlet outer diameter, and
a fuel inlet opening extending through an external surface of the collar and placing an interior of the collar in fluid communication with an exterior of the collar,
wherein the collar is disposed on the mixing tube at the mixing tube inlet with the intermediate cylindrical portion encircling a corresponding portion of the mixing tube proximate the mixing tube inlet with the intermediate cylindrical portion and the corresponding portion of the mixing tube defining a fuel reservoir, and
wherein a gap is defined between the annular rim of the mixing tube inlet and the second edge of the first cylindrical portion of the collar, with the gap placing the fuel reservoir in fluid communication with the mixing tube inlet.

8. The fuel air mixer of claim 7, wherein the collar comprises:
a first transition portion connecting the second edge of the first cylindrical portion to the first edge of the intermediate cylindrical portion; and
a second transition portion connecting the second edge of the intermediate cylindrical portion to the first edge of the second cylindrical portion.

9. The fuel air mixer of claim 8, wherein the first transition portion and the second transition portion of the collar have conical shapes.

10. The fuel air mixer of claim 7, wherein the gap defined between the annular rim of the mixing tube inlet and the second edge of the first cylindrical portion of the collar is an annular gap.

11. The fuel air mixer of claim 7, wherein the mixing tube includes an annular mixing tube inlet flange extending outwardly from the external surface of the mixing tube proximate the mixing tube inlet, and wherein the second cylindrical portion comprises a second cylindrical portion flange extending outwardly at the second edge of the second cylindrical portion, and wherein the second cylindrical portion flange engages the annular mixing tube inlet flange to align and retain the collar on the mixing tube.

12. The fuel air mixer of claim 7, wherein the mixing tube inlet and the first cylindrical portion are longitudinally aligned along a common longitudinal axis when the collar is assembled on the mixing tube.

13. The fuel air mixer of claim 7, wherein the collar comprises a fuel inlet port extending outwardly from the external surface of the collar at the fuel inlet opening.

14. A collar for a mixing tube having a mixing tube inlet with an annular rim, a mixing tube inlet inner diameter, and a mixing tube inlet outer diameter, and a mixing tube outlet in fluid communication with the mixing tube inlet, the collar comprising:
a first cylindrical portion having a first edge, an oppositely disposed second edge and a first cylindrical portion inner diameter that is less than the mixing tube inlet inner diameter;
a second cylindrical portion having a first edge, an oppositely disposed second, and a second cylindrical portion inner diameter that is greater than the mixing tube inlet outer diameter;
an intermediate cylindrical portion disposed between the first cylindrical portion and the second cylindrical portion, the intermediate cylindrical portion having a first edge connected to the second edge of the first cylindrical portion, an oppositely disposed second edge connected to the first edge of the second cylindrical portion, and an intermediate cylindrical portion inner diameter that is greater than the mixing tube inlet outer diameter; and
a fuel inlet opening extending through an external surface of the collar and placing an interior of the collar in fluid communication with an exterior of the collar, wherein the intermediate cylindrical portion encircles a corresponding portion of the mixing tube proximate the mixing tube inlet when the collar is disposed on the mixing tube, and the intermediate cylindrical portion and the corresponding portion of the mixing tube define a fuel reservoir, and wherein a gap is defined between the annular rim of the mixing tube inlet and the second edge of the first cylindrical portion of the collar, with the gap placing the fuel reservoir in fluid communication with the mixing tube inlet.

15. The collar of claim 14, comprising:
a first transition portion connecting the second edge of the first cylindrical portion to the first edge of the intermediate cylindrical portion; and
a second transition portion connecting the second edge of the intermediate cylindrical portion to the first edge of the second cylindrical portion.

16. The collar of claim 15, wherein the first transition portion and the second transition portion of the collar have conical shapes.

17. The collar of claim 14, wherein the gap defined between the annular rim of the mixing tube inlet and the second edge of the first cylindrical portion of the collar is an annular gap.

18. The collar of claim 14, wherein the mixing tube include an annular mixing tube inlet flange extending outwardly from the external surface of the mixing tube proximate the mixing tube inlet, and wherein the second cylindrical portion comprises a second cylindrical portion flange extending outwardly at the second edge of the second cylindrical portion, and wherein the second cylindrical portion flange engages the annular mixing tube inlet flange to align and retain the collar on the mixing tube.

19. The collar of claim 14, wherein the first cylindrical portion of the collar is longitudinally aligned with the mixing tube inlet along a common longitudinal axis when the collar is assembled on the mixing tube.

20. The collar of claim 14, comprising a fuel inlet port extending outwardly from the external surface of the collar at the fuel inlet opening.

* * * * *